(12) United States Patent
Ray et al.

(10) Patent No.: US 12,106,248 B2
(45) Date of Patent: Oct. 1, 2024

(54) SYSTEM AND METHOD FOR INTELLIGENT TRACKING OF DATA

(71) Applicant: JPMorgan Chase Bank, N.A., New York, NY (US)

(72) Inventors: Rajat Ray, Singapore (SG); Navnidh Bhalla, Singapore (SG); Danielle C Inagaki, Hockessin, DE (US); Charles R Yost, III, Valrico, FL (US)

(73) Assignee: JPMORGAN CHASE BANK. N.A., New York, NY (US)

( * ) Notice: Subject to any disclaimer, the term of this patent is extended or adjusted under 35 U.S.C. 154(b) by 275 days.

(21) Appl. No.: 17/150,338

(22) Filed: Jan. 15, 2021

(65) Prior Publication Data
US 2022/0230115 A1    Jul. 21, 2022

(51) Int. Cl.
*G06Q 10/0639* (2023.01)
*G06Q 10/0637* (2023.01)
*G06Q 10/105* (2023.01)

(52) U.S. Cl.
CPC . *G06Q 10/06393* (2013.01); *G06Q 10/06375* (2013.01); *G06Q 10/06398* (2013.01); *G06Q 10/105* (2013.01)

(58) Field of Classification Search
CPC ... G06Q 10/0639; G06Q 10/04; G06Q 10/067
See application file for complete search history.

(56) References Cited

U.S. PATENT DOCUMENTS

| | | | |
|---|---|---|---|
| 11,068,824 B1 * | 7/2021 | Kalis | G06Q 10/0631 |
| 2008/0033888 A1 * | 2/2008 | Flaxer | G06Q 10/00 705/36 R |
| 2019/0197168 A1 * | 6/2019 | Sylvester, II | G06F 16/248 |
| 2019/0268233 A1 * | 8/2019 | Singh | H04L 41/0896 |
| 2021/0182746 A1 * | 6/2021 | Muthukrishnan | G06F 16/93 |

* cited by examiner

*Primary Examiner* — Johnna R Loftis
(74) *Attorney, Agent, or Firm* — GREENBLUM & BERNSTEIN, P.L.C.

(57) ABSTRACT

Various methods, apparatuses/systems, and media for intelligent tracking of data are disclosed. A processor accesses a plurality of data sources that store data to be utilized for generating a single consolidated view data of resource information onto a display; determines, based on accessing the plurality of data sources, whether data discrepancies exist in terms of data quality and consistency across the plurality of data sources; automatically reconciles and normalizes the data to remove the discrepancies to enable standardized and accurate resource reporting onto the display; transmits the reconciled and normalized data to a processor for performing in-memory processing of the reconciled and normalized data; benchmarks the reconciled and normalized data against organizational goals and objective to generate benchmarked data; generates the single consolidated view data of resource information onto the display based on the benchmarked data; uncover meaningful and actionable insights; and provides optimized, actionable recommendations based on specific goals and priorities.

15 Claims, 6 Drawing Sheets

SYSTEM AND METHOD FOR INTELLIGENT TRACKING OF DATA

TECHNICAL FIELD

This disclosure generally relates to data tracking, and, more particularly, to methods and apparatuses for implementing an intelligent data tracking module that consolidates data and provides a comprehensive view of the data from various perspectives at all levels of granularity.

BACKGROUND

Today, large enterprises, corporations, agencies, institutions, and other organizations are facing a continuing problem of addressing data tracking in a quick, expedited, accurate, and meaningful manner. For example, human resources (HR) data tracking has become an increasingly important issue in recent times. Companies may want to know where their headcount is residing, what the profile of their employees is, how resources are allocated across the workforce, what the forecasted headcount is for the future and more. This may be because organizations are becoming more data-defined and deliberate in terms of how they craft their overall employee strategy and how they define their labor mapping in terms of cost and location strategy. While this may be a straightforward goal to grasp conceptually, in practice obtaining the right data, and then subsequently unveiling actionable insights, may prove to be quite cumbersome, difficult, and extremely time consuming.

For example, in many organizations, employee tracking may not done in a consolidated manner. For instance, organizations may have separate departments fir finance and HR, and more often than not, these departments work in silos, even though their data may be very compatible and may allow for richer insights. In large organizations, each line of business may have their own way of dealing with HR and finance matters, which adds even more complexity to the current problem. This may be especially true when these lines of businesses follow a shared cost/hiring model. Even if such departments collaborate closely, there nay be a variety of systems that are in play and bringing together the data in a meaningful manner is rather challenging. For example, there may be a system for requisition tracking, another system for full-time employee tracking, another system for contractor tracking, another system for potential hires, etc. With such a fragmented infrastructure, effectively navigating employee data and reconciling compatible data elements from various systems may prove to be a mammoth task.

As a consequence, senior leaders, business partners and finance controllers may spend an inordinate amount of time getting access to the various systems, manually identifying complementary data elements, cleaning the data elements and finally stitching them together. Instead of being mired in this complex process, senior leaders, business partners and finance controllers can focus on more valuable undertakings if there is a system in place to do all the heavy-lifting for them.

Conventional applications or tools or platforms or services or utilities lack the ability to intelligently consolidate, analyze, and report data back to users with incredible accuracy and user-friendliness.

SUMMARY

The present disclosure, through one or more of its various aspects, embodiments, and/or specific features or sub-components, may provide, among other features, various systems, servers, devices, methods, media, programs, and platforms for implementing an intelligent data tracking module that provides a consolidated and comprehensive view of data (i.e., employee information data) from various perspectives at all levels of granularity, but the disclosure is not limited thereto.

For example, the present disclosure, through one or more of its various aspects, embodiments, and/or specific features or sub-components, may also provide, among other features, various systems, servers, devices, methods, media, programs, and platforms for implementing an intelligent data tracking module that reconciles and normalizes headcount data across various systems and data sources; infuses its own intelligence to uncover meaningful and actionable insights (e.g., forecasting), provides optimized, actionable recommendations based on specific goals and priorities; helps users to proactively track and measure team/organization health based on key performance indicators (KPIs)/objective and key results (OKRs); implements built-in controls to ensure privileged access and to safeguard sensitive data elements; utilizes encryption and in-memory processing to guarantee security and speed; handles all the time-intensive data processing, thus freeing users and computer resources to focus on other tasks; implements various levels of abstraction so that users can view generic and specific data as needed; caters to all types of end users by implementing, e.g., Web and application programming interface (API) offerings, etc., but the disclosure is not limited thereto.

For example, the present disclosure, through one or more of its various aspects, embodiments, and/or specific features or sub-components, may also provide, among other features, various systems, servers, devices, methods, media, programs, and platforms for implementing an intelligent data tracking module that may support auto-generation of pictorial organizational charts, but the disclosure is not limited thereto.

Also, while the exemplary embodiments disclosed herein exemplify headcount data, the disclosure is not limited thereto. For example, the intelligent data tracking module's intelligence and underlying components can effectively be replicated to other use cases and other industries as well.

According to an aspect of the present disclosure, a method for intelligent tracking of data by utilizing one or more processors and one or more memories is disclosed. The method may include: accessing a plurality of data sources that store data to be utilized for generating a single consolidated view data of resource information onto a display; determining, based on accessing the plurality of data sources, whether data discrepancies exist in terms of data quality and consistency across the plurality of data sources, automatically reconciling and normalizing the data to remove the discrepancies to enable standardized and accurate resource reporting onto the display; transmitting the reconciled and normalized data to a processor for performing in-memory processing of the reconciled and normalized data; benchmarking the reconciled and normalized data against organizational goals and objective to generate benchmarked data; and generating the single consolidated view data of resource information onto the display based on the benchmarked data.

According to another aspect of the present disclosure, the method may further include: capturing supplementary data fields that are not accounted for or erroneously accounted for in any of the plurality of data sources.

According to yet another aspect of the present disclosure, the method may further include: generating data models based on the in-memory processing of the reconciled and normalized data in real time.

According to a further aspect of the present disclosure, wherein in generating the data models, the method may further include: generating data models and workflows that are hierarchical, scalable and reliable; managing pooled data accessed from the plurality of the data sources and supplementary data fields that are not accounted for or erroneously accounted for in any of the plurality of data sources based on the generated data models and workflows; and enforcing standardization and identifying any imbalances or gaps or deviations in supply data and demand data and the overall workforce strategy data based on the generated data models and work flows.

According to an additional aspect of the present disclosure, the method may further include: implementing a forecasting engine; transmitting all available data including the benchmarked data to the forecasting engine, wherein the forecasting engine is configured to ingest all available data including the benchmarked data to generate an informed prediction data using predictive analytics techniques.

According to yet another aspect of the present disclosure, the method may further include: implementing a recommendation engine that is powered by optimization algorithms; and applying the optimization algorithms to the informed prediction data to generate the best path forward data while taking into account any constraints data identified by an organization.

According to a further aspect of the present disclosure, wherein the single consolidated view data of resource information may include detailed sub-pages to track granular data thereby allowing a user to engage in strategic, informed decision-making, but the disclosure is not limited thereto.

According to an additional aspect of the present disclosure, the method may further include: implementing a dedicated web interface for data visualization and analysis.

According to yet another aspect of the present disclosure, the method may further include: implementing an application programming interface (API) for data visualization and analysis.

According to an aspect of the present disclosure, a system for intelligent tracking of data is disclosed. The system may include a plurality of data sources that store data to be utilized for generating a single consolidated view data of resource information onto a display; and a processor operatively coupled to the plurality of data sources via a communication network. The processor may be configured to: access the plurality of data sources to access the stored data to be utilized for generating the single consolidated view data of resource information onto the display; determine, based on accessing the plurality of data sources, whether data discrepancies exist in terms of data quality and consistency across the plurality of data sources; automatically reconcile and normalize the data to remove the discrepancies to enable standardized and accurate resource reporting onto the display; transmit the reconciled and normalized data to a processor for performing in-memory processing of the reconciled and normalized data benchmark the reconciled and normalized data against organizational goals and objective to generate benchmarked data; and generate the single consolidated view data of resource information onto the display based on the benchmarked data.

According to another aspect of the present disclosure, the processor may be further configured to: capture supplementary data fields that are not accounted for or erroneously accounted for in any of the plurality of data sources.

According to yet another aspect of the present disclosure, the processor may be further configured to: generate data models based on the in-memory processing of the reconciled and normalized data in real time.

According to a further aspect of the present disclosure, wherein in generating the data models, the processor may be further configured to: generate data models and workflows that are hierarchical, scalable and reliable, manage pooled data accessed from the plurality of the data sources and supplementary data fields that are not accounted for or erroneously accounted for in any of the plurality of data sources based on the generated data models and workflows; and enforce standardization and identifying any imbalances or gaps or deviations in supply data and demand data and the overall workforce strategy data based on the generated data models and workflows.

According to an additional aspect of the present disclosure, the processor may be further configured to: implement a forecasting engine; transmitting all available data including the benchmarked data to the forecasting engine, wherein the forecasting engine is configured to ingest all available data including the benchmarked data to generate an informed prediction data using predictive analytics techniques.

According to yet another aspect of the present disclosure, the processor may be further configured to implement a recommendation engine that is powered by optimization algorithms, and apply the optimization algorithms to the informed prediction data to generate the best path forward data while taking into account any constraints data identified by an organization.

According to a further aspect of the present disclosure, the processor may be further configured to: implement a dedicated web interface for data visualization and analysis.

According to yet another aspect of the present disclosure, the processor may be further configured to: implement an application programming interface (API) for data visualization and analysis.

According to an aspect of the present disclosure, a non-transitory computer readable medium configured to store instructions for intelligent tracking of data is disclosed. The instructions, when executed, may cause a processor to perform the following accessing a plurality of data sources that store data to be utilized for generating a single consolidated view data of resource information onto a display, determining, based on accessing the plurality of data sources, whether data discrepancies exist in terms of data quality and consistency across the plurality of data sources; automatically reconciling and normalizing the data to remove the discrepancies to enable standardized and accurate resource reporting onto the display; transmitting the reconciled and normalized data to a processor for performing in-memory processing of the reconciled and normalized data, benchmarking the reconciled and normalized data against organizational goals and objective to generate benchmarked data; and generating the single consolidated view data of resource information onto the display based on the benchmarked data.

According to another aspect of the present disclosure, the instructions, when executed, may cause the processor to further perform the following: capturing supplementary data fields that are not accounted for or erroneously accounted for in any of the plurality of data sources.

According to yet another aspect of the present disclosure, the instructions, when executed, may cause the processor to further perform the following: generating data models based on the in-memory processing of the reconciled and normalized data in real time.

According to a further aspect of the present disclosure, wherein in generating the data models, the instructions, when executed, may cause the processor to further perform the following: generating data models and workflows that are hierarchical, scalable and reliable; managing pooled data accessed from the plurality of the data sources and supplementary data fields that are not accounted for or erroneously accounted for in any of the plurality of data sources based on the generated data models and workflows; and enforcing standardization and identifying any imbalances or gaps or deviations in supply data and demand data and the overall workforce strategy data based on the generated data models and workflows.

According to an additional aspect of the present disclosure, the instructions, when executed, may cause the processor to further perform the following: implementing a forecasting engine; transmitting all available data including the benchmarked data to the forecasting engine, wherein the forecasting engine is configured to ingest all available data including the benchmarked data to generate an informed prediction data using predictive analytics techniques.

According to yet another aspect of the present disclosure, the instructions, when executed, may cause the processor to further perform the following implementing a recommendation engine that is powered by optimization algorithms; and applying the optimization algorithms to the informed prediction data to generate the best path forward data while taking into account any constraints data identified by an organization.

According to an additional aspect of the present disclosure, the instructions, when executed, may cause the processor to further perform the following: implementing a dedicated web interface for data visualization and analysis.

According to yet another aspect of the present disclosure, the instructions, when executed, may cause the processor to further perform the following: implementing an application programming interface (API) for data visualization and analysis.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
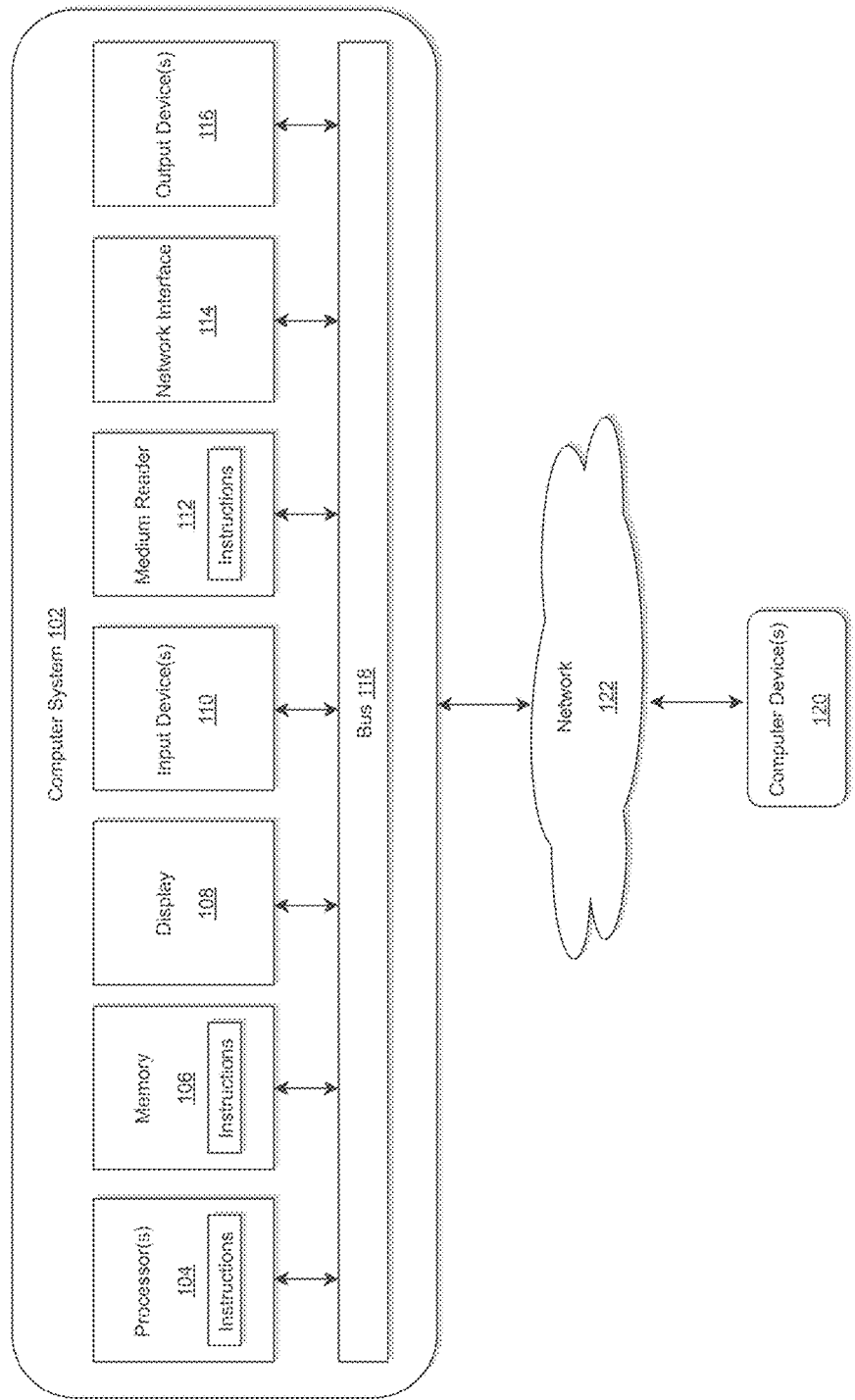
FIG. 1 illustrates a computer system for implementing an intelligent data tracking module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings (FIGS. 1-6), in terms of functional blocks, units, engines and/or modules. Those skilled in the art will appreciate that these blocks, units, engines, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, and/or modules being implemented by microprocessors or similar, they may be programmed using software (e.g., microcode) to perform various functions discussed herein and may optionally be driven by firmware and/or software. Alternatively, each block, unit, engine, and/or module may be implemented by dedicated hardware, or as a combination of dedicated hardware to perform some functions and a processor (e.g., one or more programmed microprocessors and associated circuitry) to perform other functions. Also, each block, unit, engine, and/or module of the example embodiments may be physically separated into two or more interacting and discrete blocks, units, engines, and/or modules without departing from the scope of the inventive concepts. Further, the blocks, units, engines, and/or modules of the example embodiments may be physically combined into more complex blocks, units, engines, and/or modules without departing from the scope of the present disclosure.

FIG. 1 is an exemplary system for use in implementing an intelligent data tracking module that provides a consolidated and comprehensive view of data (i.e., employee information data) from various perspectives at all levels of granularity in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions. e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example. Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an intelligent data tracking module that provides a consolidated and comprehensive view of data (i.e., employee information data) from various perspectives at all levels of granularity, but the disclosure is not limited thereto.

Figure 2:
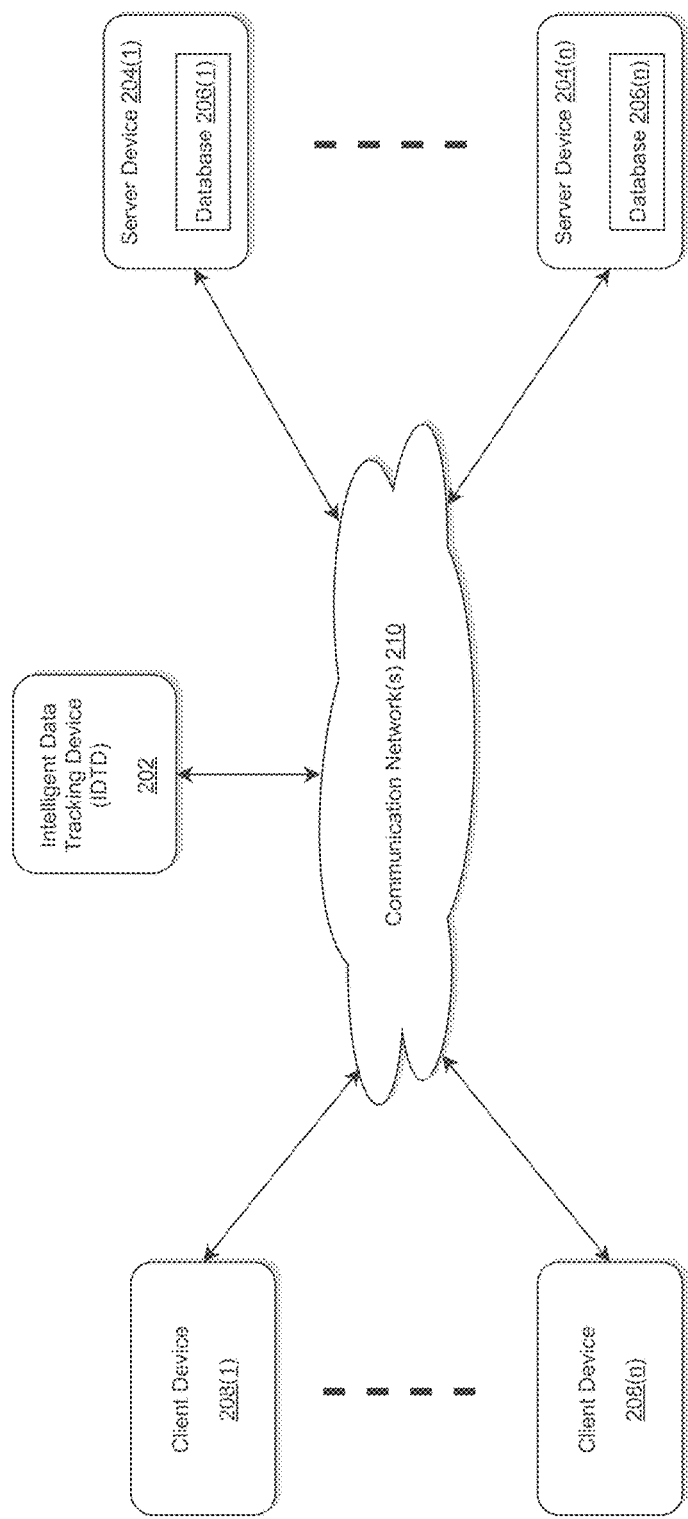
FIG. 2 illustrates an exemplary diagram of a network environment with an intelligent data tracking device in accordance with an exemplary embodiment.

Referring to FIG. 2, a schematic of an exemplary network environment 200 for implementing an intelligent data tracking device (IDTD) of the instant disclosure is illustrated.

According to exemplary embodiments, the above-described problems associated with conventional methods and systems may be overcome by implementing an IDTD 202 as illustrated in FIG. 2 by implementing an intelligent data tracking module that provides a consolidated and comprehensive view of data (i.e., employee information data) from various perspectives at all levels of granularity, but the disclosure is not limited thereto.

The IDTD 202 may be the same or similar to the computer system 102 as described with respect to FIG. 1.

The IDTD 202 may store one or more applications that can include executable instructions that, when executed by the IDTD 202, cause the IDTD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IDTD 202 itself, may be located in virtual server(s) running in a cloud-based computing environment rather than being tied to one or more specific physical network computing devices. Also, the application(s) may be running in one or more virtual machines (VMs) executing on the IDTD 202. Additionally, in one or more embodiments of this technology, virtual machine(s) running on the IDTD 202 may be managed or supervised by a hypervisor.

In the network environment 200 of FIG. 2, the IDTD 202 is coupled to a plurality of server devices 204(1)-204(n) that hosts a plurality of databases 206(1)-206(n), and also to a plurality of client devices 208(1)-208(n) via communication network(s) 210. A communication interface of the IDTD 202, such as the network interface 114 of the computer system 102 of FIG. 1, operatively couples and communicates between the IDTD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IDTD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs). Ethernet-based Packet Data Networks (PDNs), combinations thereof, and the like.

The IDTD 202 may be a standalone device or integrated with one or more other devices or apparatuses, such as one or more of the server devices 204(1)-204(n), for example. In one particular example, the IDTD 202 may be hosted by one of the server devices 204(1)-204(n), and other arrangements are also possible. Moreover, one or more of the devices of the IDTD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IDTD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(l)-208(n).

According to exemplary embodiments, the client devices 208(1)-208(n) in this example may include any type of computing device that can facilitate the implementation of the IDTD 202 that may be configured for implementing an intelligent data tracking module that provides a consolidated and comprehensive view of data (i.e., employee information data) from various perspectives at all levels of granularity, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the IDTD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the IDTD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 20X), such as the IDTD 202, the server devices 204(1)-204(n), or the client devices 208(1)-208(n), for example, may be configured to operate as virtual instances on the same physical machine. For example, one or more of the IDTD 202, the server devices 204(1)-204(n), or the client devices 208(l)-208(n) may operate on the same physical device rather than as separate devices communicating through communication network(s) 210. Additionally, there may be more or fewer IDTDs 202, server devices 204(1)-204(n), or client devices 208(l)-208(n) than illustrated in FIG. 2.

In addition, two or more computing systems or devices may be substituted for any one of the systems or devices in am example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks. Packet Data Networks (PDNs), the Internet, intranets, and combinations thereof.

Figure 3:
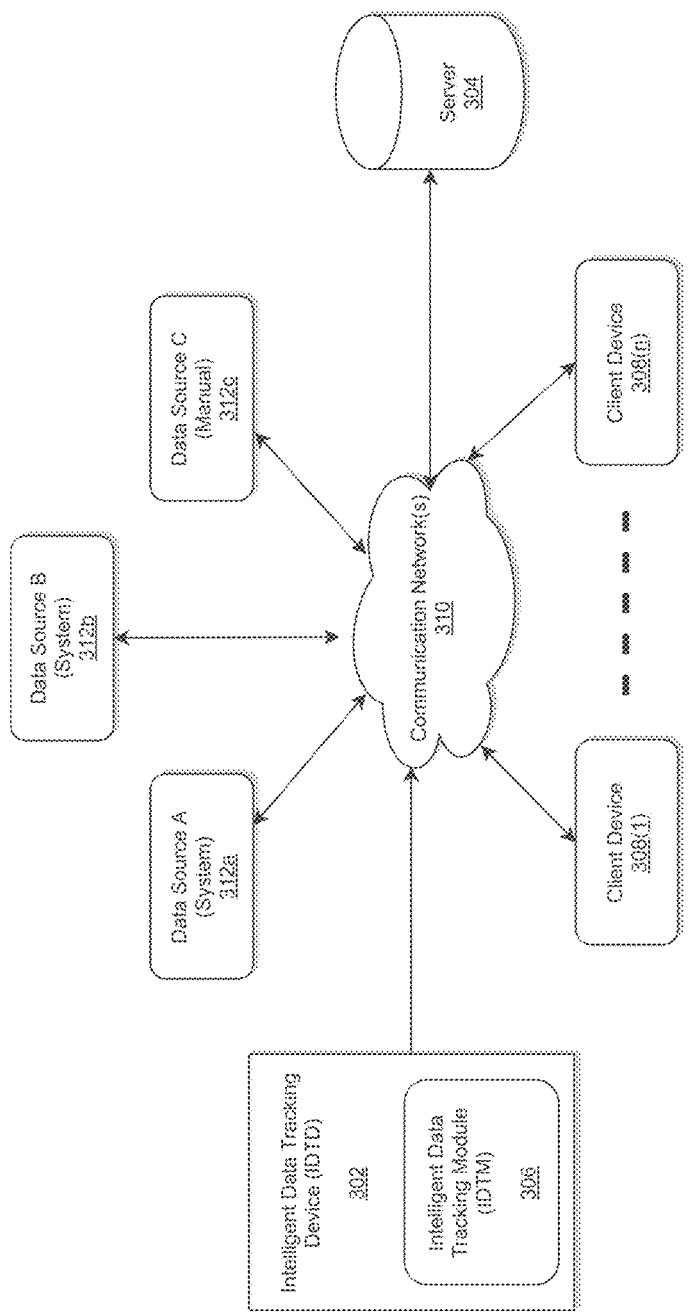
FIG. 3 illustrates a system diagram for implementing intelligent data tracking device with an intelligent data tracking module in accordance with an exemplary embodiment.

FIG. 3 illustrates a system diagram 300 for implementing an IDTD with an intelligent data tracking module (IDTM) in accordance with an exemplary embodiment.

As illustrated in FIG. 3, the IDTD 302 including the IDTM 306 may be connected to a server 304, and a plurality of data sources (e.g., data source A 312a, data source B 312b, data source C 312c, etc.) via a communication network 310, but the disclosure is not limited thereto. Although only two system data sources (312a. 312b) and one manual data source (312c) are illustrated in FIG. 3, it should be noted that any desired number of data sources may be utilized by the IDTM 306. The data sources 312a, 312b. 312c may store data to be utilized for generating a single consolidated view data of resource information onto a display in accordance with exemplary embodiments disclosed herein, but the disclosure is not limited thereto.

The IDTD 302 may also be connected to a plurality of client devices 308(1)-308(n) via the communication network 310, but the disclosure is not limited thereto. According to exemplary embodiments, the IDTM 306 may be implemented within the client devices 308(1)-308(n), but the disclosure is not limited thereto. According to exemplary embodiments, the client devices 308(1)-308(n) may be utilized for implementing the IDTM 306, but the disclosure is not limited thereto.

According to exemplary embodiment, the IDTD 302 is described and shown in FIG. 3 as including the IDTM 306, although it may include other rules, policies, modules, databases, or applications, for example. According to exemplary embodiments, the data sources 312a, 312b, 312c may be embedded within the IDTD 302. The data sources 312a, 312b, 312c, via the server 304, may include one or more memories configured to store login information, data files, data content, etc., but the disclosure is not limited thereto. According to exemplary embodiments, the IDTM 306 may be configured to be storage platform agnostic—configured to be deployed across multiple storage layers.

According to exemplary embodiments, the IDTM 306 may be configured to receive continuous feed of data from the data sources 312a. 312b. 312c and the server 304 via the communication network 310.

As will be described below, the IDTM 306 may be configured to access the plurality of data sources 312a. 312b. 312c to access the stored data to be utilized for generating the single consolidated view data of resource information onto the display; determine, based on accessing the plurality of data sources 312a, 312b. 312c, whether data discrepancies exist in terms of data quality and consistency across the plurality of data sources 312a, 312b, 312c; automatically reconcile and normalize the data to remove the discrepancies to enable standardized and accurate resource reporting onto the display; transmit the reconciled and normalized data to a processor for performing in-memory processing of the reconciled and normalized data; benchmark the reconciled and normalized data against organizational goals and objective to generate benchmarked data; and generate the single consolidated view data of resource information onto the display based on the benchmarked data, but the disclosure is not limited thereto.

The plurality of client devices 308(1)-308(n) are illustrated as being in communication with the IDTD 302. In this regard, the plurality of client devices 308(1)-308(n) may be "clients" of the IDTD 302 and are described herein as such. Nevertheless, it is to be known and understood that the plurality of client devices 308(1)-308(n) need not necessarily be "clients" of the IDTD 302, or any entity described in association therewith herein. Any additional or alternative relationship may exist between either or more of the plurality of client devices 308(1)-308(n) and the IDTD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the IDTD 302 via broadband or cellular communication. Of course, these embodiments are merely exemplary and are not limiting or exhaustive.

Figure 4:
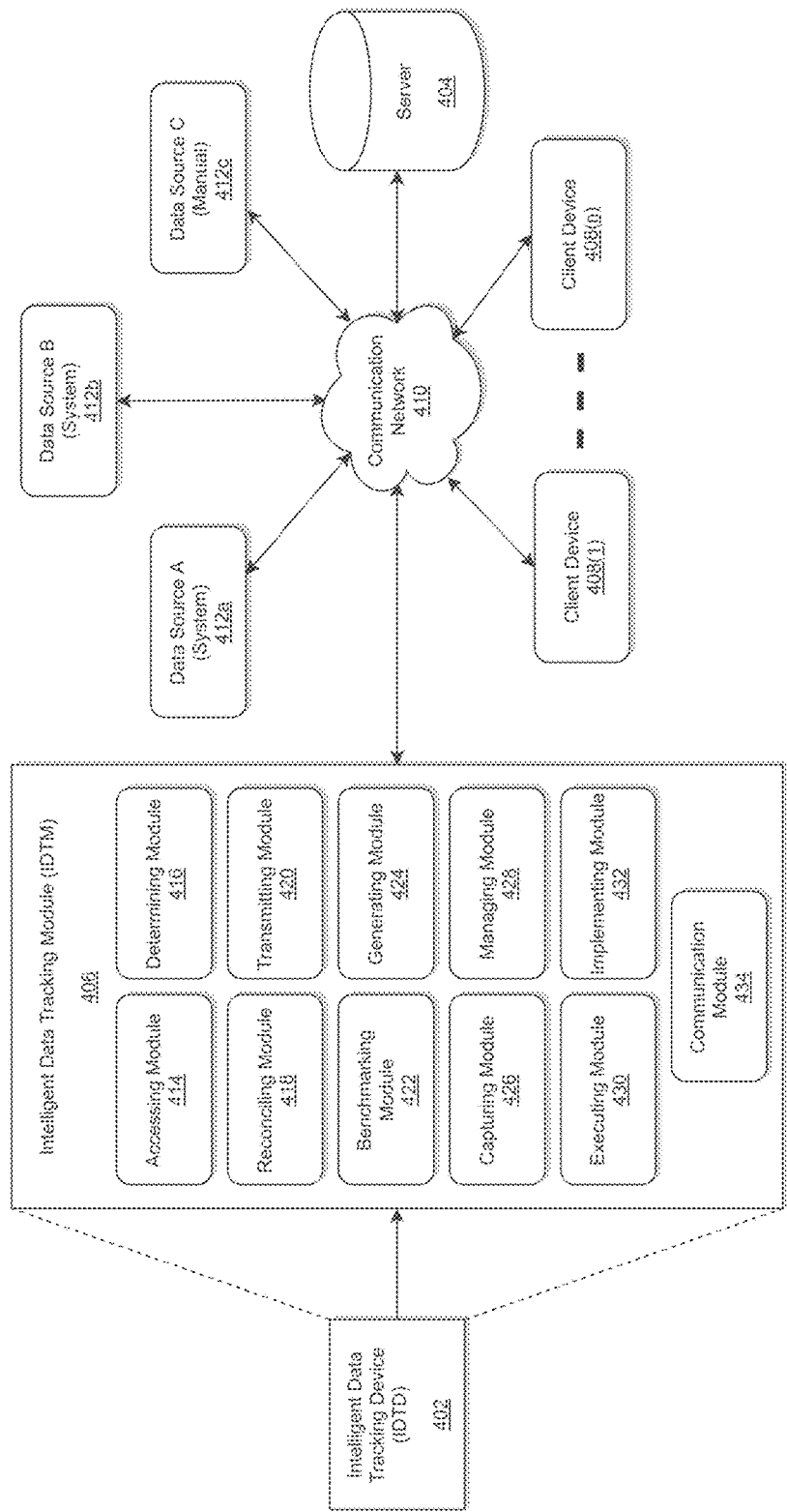
FIG. 4 illustrates a system diagram for implementing an intelligent data tracking module of FIG. 3 in accordance with an exemplary embodiment.

FIG. 4 illustrates a system diagram for implementing an IDTM of FIG. 3 in accordance with an exemplary embodiment. As illustrated in FIG. 4, the system 400 may include an IDTD 402 within which an IDTM 406 may be embedded, a plurality of data sources (412a, 412b, 412c), a server 404, client devices 408(1)-408(n), and a communication network 410. According to exemplary embodiments, the IDTD 402, the IDTM 406, the plurality of data sources 412a. 412b, 412c, the server 404, the client devices 408(l)-408(n), and the communication network 410 as illustrated in FIG. 4 may be the same or similar to the IDTD 302, the IDTM 306, the plurality of data sources 312a. 312b. 312c, the server 304, the client devices 308(1)-308(n), and the communication network 310, respectively, as illustrated in FIG. 3.

According to exemplary embodiments, although only two system data sources (412a, 412b) and one manual data source (412c) are illustrated in FIG. 4, it should be noted that any desired number of data sources may be utilized by the IDTM 406. The data sources 412a, 412b, 412c may store data to be utilized for generating a single consolidated view data of resource information onto a display in accordance with exemplary embodiments disclosed herein.

As illustrated in FIG. 4, the IDTM 406 may include an accessing module 414, a determining module 416, a reconciling module 418, a transmitting module 420, a benchmarking module 422, a generating module 424, a capturing module 426, a managing module 428, an executing module 430, an implementing module 432, and a communication module 434. According to exemplary embodiments, the data sources 412a, 412b. 412c may be external to the IDTD 402 may include various systems that are managed and operated by an organization. Alternatively, according to exemplary embodiments, the data sources 412a. 412b. 412c may be embedded within the IDTD 402 and/or the IDTM 406.

According to exemplary embodiments, the IDTM 406 may be implemented via user interfaces, e.g., web user interface, etc., but the disclosure is not limited thereto, and may be integrated with a private cloud platform via the IDTM 406 and an authentication service, but the disclosure is not limited thereto. The user interface may be operatively connected to a system of record in one end and an open source platform for analytics and dashboard in another end.

The process may be executed via the communication module 434 and the communication network 410, which may comprise plural networks as described above. For example, in an exemplary embodiment, the various components of the IDTM 406 may communicate with the server 404, and the data sources 412a. 412b, 412c via the communication module 434 and the communication network 410. Of course, these embodiments are merely exemplary and are not limiting or exhaustive.

According to exemplary embodiments, the communication network 410 and the communication module 434 may be configured to establish a link between the data sources 412a, 412b, 412c, the client devices 408(1)-408(n) and the IDTM 406.

According to exemplary embodiments, each of the accessing module 414, determining module 416, reconciling module 418, transmitting module 420, benchmarking module 422, generating module 424, capturing module 426, managing module 428, executing module 430, implementing module 432, and the communication module 434 may be implemented by microprocessors or similar, they may be programmed using software (e.g., microcode) to perform various functions discussed herein and may optionally be driven by firmware and/or software. Alternatively, each of the accessing module 414, determining module 416, reconciling module 418, transmitting module 420, benchmarking module 422, generating module 424, capturing module 426, managing module 428, executing module 430, implementing module 432, and the communication module 434 may be implemented by dedicated hardware, or as a combination of dedicated hardware to perform some functions and a processor (e.g., one or more programmed microprocessors and associated circuitry) to perform other functions. Also, according to exemplary embodiments, each of the accessing module 414, determining module 416, reconciling module 418, transmitting module 420, benchmarking module 422, generating module 424, capturing module 426, managing module 428, executing module 430, implementing module 432, and the communication module 434 may be physically separated into two or more interacting and discrete blocks, units, devices, and/or modules without departing from the scope of the inventive concepts.

According to exemplary embodiments, each of the accessing module 414, determining module 416, reconciling module 418, transmitting module 420, benchmarking module 422, generating module 424, capturing module 426, managing module 428, executing module 430, implementing module 432, and the communication module 434 of the IDTM 406 may be called by corresponding API, but the disclosure is not limited thereto.

Figure 5:
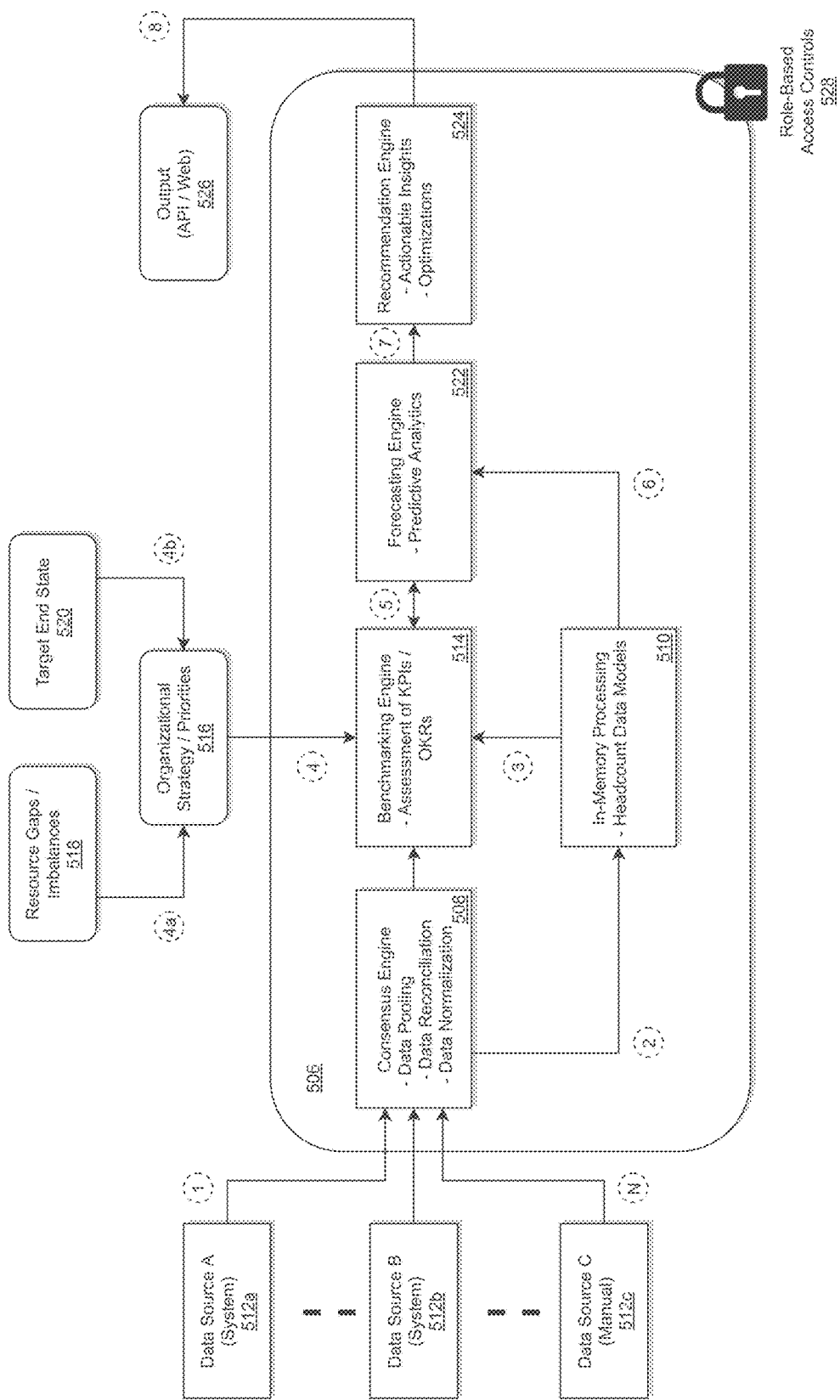
FIG. 5 illustrates an exemplary architecture diagram that implements an intelligent data tracking module of FIG. 4 in accordance with an exemplary embodiment.

FIG. 5 illustrates an exemplary architecture diagram that implements an IDTM of FIG. 4 in accordance with an exemplary embodiment.

As illustrated in FIG. 5, the exemplary architecture diagram 500 may include an intelligent data tracking module (IDTM) 506 that may receive data from a plurality of data sources 512a. 512b, 512c. These data sources 512a, 512b, 512c may be the same or similar to the data sources 312a. 312b, 312c as illustrated in FIG. 3 and/or the data sources 412a. 412b, 412c as illustrated in FIG. 4. Although only two system data sources (512a, 512b) and one manual data source (512c) are illustrated in FIG. 5, it should be noted that any desired number of data sources may be utilized by the IDTM 506. The data sources 512a, 512b, 512c may store data to be utilized for generating a single consolidated view data of resource information onto a display in accordance with exemplary embodiments disclosed herein, but the disclosure is not limited thereto.

According to exemplary embodiments, the IDTM 506 may include a consensus engine 508, an in-memory processing engine 510, a benchmarking engine 514, a forecasting engine 522, and a recommendation engine 524, but the disclosure is not limited thereto. As illustrated in FIG. 5, the organizational strategy/priorities data 516 can be generated from resource gaps/imbalances data 518 (i.e., step 4a) and target end state data 520 (i.e., step 4b).

According to exemplary embodiments, data may be received by the consensus engine 508 by accessing the data sources 512a. 512b, 512c (i.e., steps 1 and N). Thus, the consensus engine 508 may perform data pooling, data reconciliation, and data normalization as discussed herein with respect to FIG. 4, but the disclosure is not limited thereto.

Data from the consensus engine 508 may flow to in-memory processing engine 510 (i.e., step 2). The in-memory processing engine 510 may generate data models as disclosed herein with respect to FIG. 4, but the disclosure is not limited thereto.

Both the benchmarking engine 514 (i.e., step 3) and the forecasting engine 522 (i.e., step 6) may receive the data processed by in-memory processing engine 510. The benchmarking engine 514 may also receive the organizational strategy/properties data 516 (i.e., step 4). According to exemplary embodiments, there may be two-way data flow between the benchmarking engine 514 and the forecasting engine 522 (i.e., step 5). According to exemplary embodiments, the benchmarking engine 514 may perform assessment of KPIs/OKRs and the forecasting engine 522 may perform predictive analytics as disclosed herein with respect to FIG. 4, but the disclosure is not limited thereto.

The recommendation engine 524 may receive data from the forecasting engine 522 (i.e., step 7) and generate output as disclosed herein with respect to FIG. 4 to the output device 526 (i.e., step 8).

According to exemplary embodiments, the IDTM 506 may implement role based access controls 524 features.

Referring to both FIGS. 4-5, according to exemplary embodiments, the accessing module 414 may access the plurality of data sources 412a, 412b. 412c to capture data stored therein. The plurality of data sources 412a, 412b, 412c may store data to be utilized for generating a single consolidated view data of resource information onto a display.

The determining module 416 may determine, based on accessing the plurality of data sources 412a, 412b. 412c, whether data discrepancies exist in terms of data quality and consistency across the plurality of data sources 412a, 412b, 412c. Oftentimes when multiple systems and data sources are involved, the data quality and consistency across them may questionable (e.g., local versus functional/matrix manager hierarchies being independently reported in different systems). The reconciling module 418 may be configured to automatically reconcile the data and removes such discrepancies to enable standardized and accurate resource reporting. A key aspect in this dimension is the IDTM's 506 consensus engine 508 which ensures that the various systems and data sources agree with one another regarding records stored across them. This, in aggregate, improves the reliability of the fragmented data.

The consensus engine 508 may also automatically normalize the data to remove the discrepancies to enable standardized and accurate resource reporting onto the display.

Not only does the IDTM 406, 506 leverage existing systems/sources, but it also allows for business partners and finance controllers to capture supplementary data fields that are not accounted for/erroneously accounted for in any existing system of record (e.g. unofficial roles). Such flexibility ensures that the full gamut of potential use cases is captured (e.g., full-time employees, part-time employees, contractors, interns, apprentices, employees on sabbatical, employees on maternity/paternity leave etc., and all their corresponding data fields).

The transmitting module 420 may transmit the reconciled and normalized data output from the consensus engine 508 to the in-memory processing engine 510 for performing in-memory processing of the reconciled and normalized data. The in-memory processing engine 510 may output data models to be utilized by the benchmarking engine 514.

According to exemplary embodiments, the IDTM 406, 506 may utilize data models and workflows that are hierarchical, scalable and reliable. This allows for managing pooled data as well as bespoke data in a proper manner, and allows for to easily enforce standardization and identify any imbalances/gaps/deviations in supply and demand and the overall workforce strategy.

According to exemplary embodiments the benchmarking module 514, by utilizing the benchmarking engine 514, may benchmark the reconciled and normalized data against organizational goals and objective to generate benchmarked data for the forecasting engine 522. For example, all the consolidated and enriched data (i.e., reconciled and normalized data) mas be benchmarked by the benchmarking engine 514 against organizational goals and objectives. This allows teams to effectively track and measure performance against KPIs/OKRs based on default or custom thresholds/configurations. For example, by utilizing the IDTM 406, 506, organizations can get a sensing of how 'product-aligned' they are, assuming that this is one of the metrics that they are concerned with.

The generating module 424, by utilizing the recommendation engine 524 may generate a single consolidated view data of resource information onto the display 526 based on the benchmarked data.

Thus, according to exemplary embodiments, the IDTM 406, 506 may be configured to provide data-driven insights. By intelligently pooling data from various systems and sources, and by then analyzing the data to unveil meaningful conclusions, the IDTM 406, 506 ensures that multiple organizational and financial dimensions are reported and considered, thereby facilitating strategic decision-making for things like budgeting, hiring, location strategy and so on. A key aspect in this dimension may be the IDTM's 506 forecasting engine 522 that ingests all available data to make an informed prediction using predictive analytics on headcount, budget, forecasts etc. This allows for effective short-term, mid-term, and long-term planning from a team level all the way up to the global level.

According to exemplary embodiments, the IDTM 406, 506 may also be configured to provide tailored recommendations. For example, in case business partners and finance controllers are looking for some guidance or a second opinion, they can tap into the IDTM's 506 recommendation engine 524. This recommendation engine 524 makes suggestions and advises such stakeholders on how they could improve their workforce strategy based on their priorities. The recommendation engine 524 is powered by optimization algorithms that suggest the best path forward while taking into account any constraints. For example, if a team needs to hire four employees, but they have the budget for only three, the IDTM 506 will formulate ways to satisfy this constraint (e.g., by factoring in other regions where employee cost may be lower).

According to exemplary embodiments, the IDTM 406, 506 may also be configured to provide productive engagement. For example users can easily interact with IDTM 406, 506 through its dedicated web interface for data visualization and analysis as well as through its API (see. e.g., output 526 of FIG. 5). These offerings may primarily give rise to user-friendliness and extensibility, and makes the process of analyzing, planning and forecasting employee data much more seamless.

According to exemplary embodiments, the IDTM 406, 506 may also be configured to leverage innovative in-memory processing. For example, the generating module 424, by utilizing the in-memory processing engine 510, may generate the data models based on the in-memory processing of the reconciled and normalized data in real time. This allows data to be analyzed in real time, enabling faster reporting and decision-making in business, as opposed to the current solutions on the market that utilize older technologies like disk storage/relational databases and are therefore mostly scheduler-driven instead of being on-demand.

According to exemplary embodiments, in generating the data models, the generating module 424 may generate data models and workflows that are hierarchical, scalable and reliable. For example, the managing module 428 may manage pooled data accessed from the plurality of the data sources and supplementary data fields that are not accounted for or erroneously accounted for in an of the plurality of data sources based on the generated data models and workflows. The executing module 430 may enforce standardization and identifying any imbalances or gaps or deviations in supply data and demand data and the overall workforce strategy data based on the generated data models and workflows.

According to exemplary embodiments, the transmitting module 420 may transmit all available data including the benchmarked data to the forecasting engine 522, wherein the forecasting engine 522 is configured to ingest all available data including the benchmarked data to generate an informed prediction data using predictive analytics techniques.

According to exemplary embodiments, the executing module 430 may apply the optimization algorithms to the informed prediction data to generate the best path forward data while taking into account any constraints data identified by an organization.

According to exemplary embodiments, the implementing module 432 may implement a dedicated web interface for data visualization and analysis. According to exemplary embodiments, the implementing module 432 may also implement an API for data visualization and analysis.

According to exemplary embodiments, the IDTM 406, 506 may also be configured to provide offers role-based access controls 528. This allows for users to be properly authenticated and authorized, which is especially important when it comes to data that is sensitive or bound by restrictions. The data sets and fields returned will be in accordance to their permission/role levels.

According to exemplary embodiments, the IDTM 406, 506 may also be configured to further protect data by encrypting it at rest and in transition by following contemporary security standards. This ensures that in the unfortunate event that there is a data breach or a malicious cyber-attack, the data returned to the adversary is anonymized and random to the extent that he/she/they cannot use it maliciously.

Figure 6:
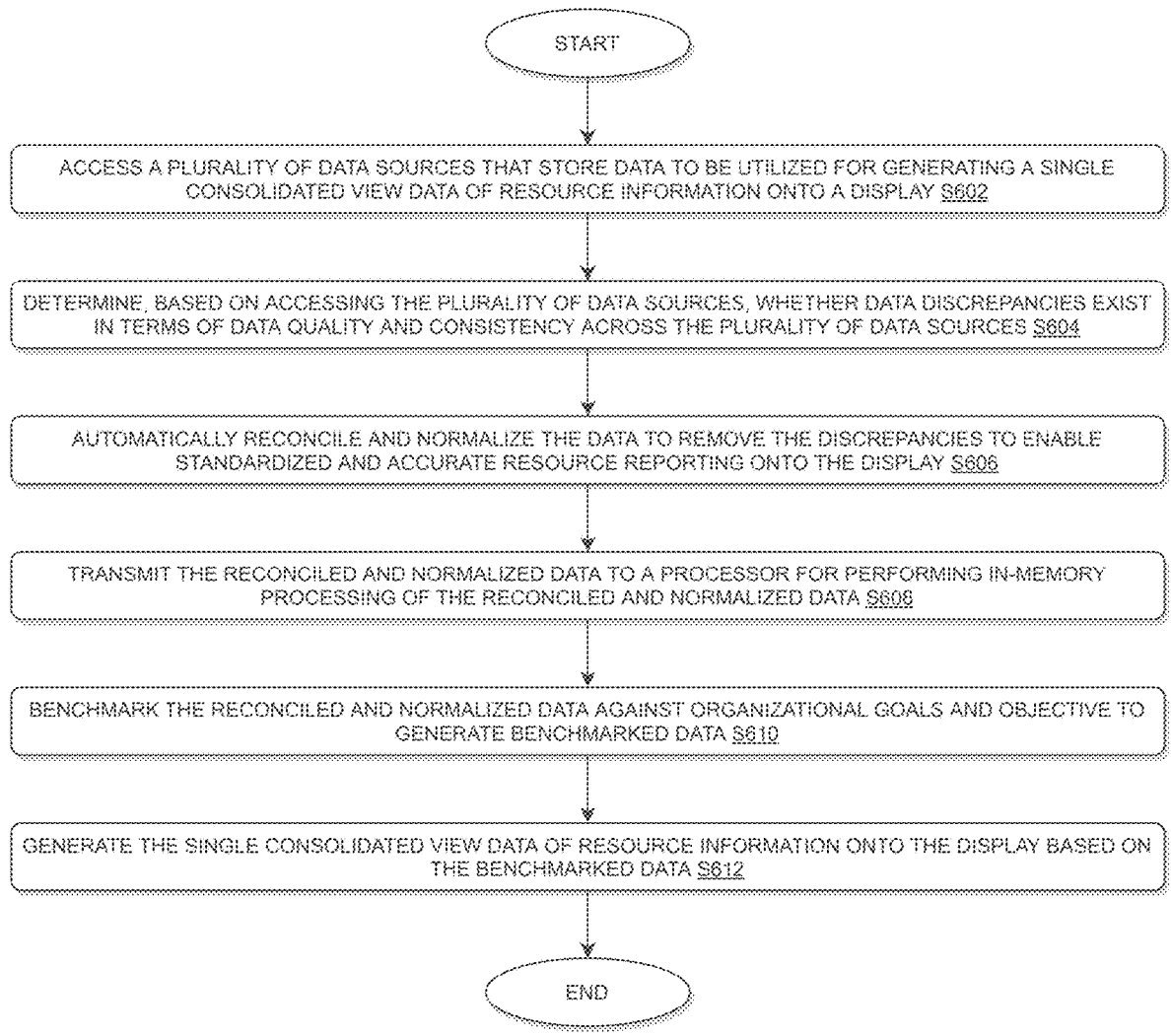
FIG. 6 illustrates a flow diagram for intelligent tracking of data in accordance with an exemplary embodiment.

FIG. 6 illustrates a flow diagram for intelligent tracking of data and generating a single consolidated view onto a display in accordance with an exemplary embodiment.

In the process 600 of FIG. 6, at step S612, a plurality of data sources may be accessed to capture data stored therein. The plurality of data sources may store data to be utilized for generating a single consolidated view data of resource information onto a display. The data sources may be the same or similar to the data sources 312a. 312b, 312c, 412a. 412b, 412c. 512a. 512b, 512c as disclosed herein with respect to FIGS. 3-5, but the disclosure is not limited thereto.

At step S604, the process 600 may determine, based on accessing the plurality of data sources, whether data discrepancies exist in terms of data quality and consistency across the plurality of data sources.

At step S606, the process 600 may automatically reconcile and normalize the data to remove the discrepancies to enable standardized and accurate resource reporting onto the display.

At step S608, the process 600 may transmit the reconciled and normalized data to a processor for performing in-memory processing of the reconciled and normalized data.

At step S610, the process 600 may benchmark the reconciled and normalized data against organizational goals and objective to generate benchmarked data.

At step S612, the process 600 may generate the single consolidated view data of resource information onto the display based on the benchmarked data.

According to exemplary embodiments, the process 600 may further include, capturing supplementary data fields that are not accounted for or erroneously accounted for in any of the plurality of data sources.

According to exemplary embodiments, the process 600 may further include: generating data models based on the in-memory processing of the reconciled and normalized data in real time.

According to exemplary embodiments, wherein in generating the data models, the instructions. According to exemplary embodiments, the process 600 may further include: generating data models and workflows that are hierarchical, scalable and reliable, managing pooled data accessed from the plurality of the data sources and supplementary data fields that are not accounted for or erroneously accounted for in any of the plurality of data sources based on the generated data models and workflows; and enforcing standardization and identifying any imbalances or gaps or deviations in supply data and demand data and the overall workforce strategy data based on the generated data models and workflows.

According to exemplary embodiments, the process 600 may further include: implementing a forecasting engine; transmitting all available data including the benchmarked data to the forecasting engine, wherein the forecasting engine is configured to ingest all available data including the benchmarked data to generate an informed prediction data using predictive analytics techniques.

According to exemplary embodiments, the process 600 may further include: implementing a recommendation engine that is powered by optimization algorithms; and applying the optimization algorithms to the informed prediction data to generate the best path forward data while taking into account any constraints data identified by an organization.

According to exemplary embodiments, the process 600 may further include: implementing a dedicated web interface for data visualization and analysis.

According to exemplary embodiments, the process 600 may further include: implementing an application programming interface (API) for data visualization and analysis.

According to exemplary embodiments, the IDTD 402 may include a memory (e.g., a memory 106 as illustrated in FIG. 1) which may be a non-transitory computer readable medium that may be configured to store instructions for implementing an IDTM 406 for intelligent tracking of data as disclosed herein. The IDTD 402 may also include a medium reader (e.g., a medium reader 112 as illustrated in FIG. 1) which may be configured to read any one or more sets of instructions, e.g., software, from any of the memories described herein. The instructions, when executed by a processor embedded within the IDTM 406 or within the IDTD 402, may be used to perform one or more of the methods and processes as described herein. In a particular embodiment, the instructions may reside completely, or at least partially, within the memory 106, the medium reader 112, and/or the processor 104 (see FIG. 1) during execution by the IDTD 402.

For example, the instructions, when executed, may cause the processor 104 to perform the following: accessing a plurality of data sources that store data to be utilized for generating a single consolidated view data of resource information onto a display; determining, based on accessing the plurality of data sources, whether data discrepancies exist in terms of data quality and consistency across the plurality of data sources; automatically reconciling and normalizing the data to remove the discrepancies to enable standardized and accurate resource reporting onto the display, transmitting the reconciled and normalized data to a processor for performing in-memory processing of the reconciled and normalized data, benchmarking the reconciled and normalized data against organizational goals and objective to generate benchmarked data, and generating the single consolidated view data of resource information onto the display based on the benchmarked data.

According to exemplary embodiments, the instructions, when executed, may cause the processor 104 to further perform the following: capturing supplementary data fields that are not accounted for or erroneously accounted for in any of the plurality of data sources.

According to exemplary embodiments, the instructions, when executed, may cause the processor 104 to further perform the following, generating data models based on the in-memory processing of the reconciled and normalized data in real time.

According to exemplary embodiments, wherein in generating the data models, the instructions, when executed, may cause the processor 104 to further perform the following: generating data models and workflows that are hierarchical, scalable and reliable, managing pooled data accessed from the plurality of the data sources and supplementary data fields that are not accounted for or erroneously accounted for in any of the plurality of data sources based on the generated data models and workflows; and enforcing standardization and identifying any imbalances or gaps or deviations in supply data and demand data and the overall workforce strategy data based on the generated data models and workflows.

According to exemplary embodiments, the instructions, when executed, may cause the processor 104 to further perform the following implementing a forecasting engine; transmitting all available data including the benchmarked data to the forecasting engine, wherein the forecasting engine is configured to ingest all available data including the benchmarked data to generate an informed prediction data using predictive analytics techniques.

According to exemplary embodiments, the instructions, when executed, may cause the processor 104 to further perform the following: implementing a recommendation engine that is powered by optimization algorithms, and applying the optimization algorithms to the informed prediction data to generate the best path forward data while taking into account an constraints data identified by an organization.

According to exemplary embodiments, the instructions, when executed, may cause the processor 104 to further perform the following, implementing a dedicated web interface for data visualization and analysis.

According to exemplary embodiments, the instructions, when executed, may cause the processor 104 to further perform the following: implementing an application programming interface (API) for data visualization and analysis.

According to exemplary embodiments as disclosed above in FIGS. 1-6, technical improvements effected by the instant disclosure may include platforms for implementing an intelligent data tracking module that provides a consolidated and comprehensive view of data (i.e., employee information data) from various perspectives at all levels of granularity, but the disclosure is not limited thereto.

According to exemplary embodiments as disclosed above in FIGS. 1-6, technical improvements effected by the instant disclosure may include platforms for implementing an intelligent data tracking module that reconciles and normalizes headcount data across various systems and data sources; infuses its own intelligence to uncover meaningful and actionable insights (e.g., forecasting), provides optimized, actionable recommendations based on specific goals and priorities; helps users to proactively track and measure team/organization health based on key performance indicators (KPIs)/objective and key results (OKRs); implements built-in controls to ensure privileged access and to safeguard sensitive data elements; utilizes encryption and in-memory processing to guarantee security and speed; handles all the time-intensive data processing, thus freeing users and computer resources to focus on other tasks; implements various levels of abstraction so that users can view generic and specific data as needed; caters to all types of end users by implementing. e.g., Web and application programming interface (API) offerings, etc., but the disclosure is not limited thereto.

According to exemplary embodiments as disclosed above in FIGS. 1-6, technical improvements effected by the instant disclosure may include platforms for implementing an intelligent data tracking module that may support auto-generation of pictorial organizational charts, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing. Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for intelligent tracking of data by utilizing one or more processors and one or more memories, the method comprising:
implementing an intelligent data tracking module (IDTM) that provides a consolidated and comprehensive view of data from various perspectives at all levels of granularity, the IDTM including an accessing module, a determining module, a reconciling module, a transmitting module, a benchmarking module, a generating module, and an implementing module, wherein each module being called via a corresponding application programming interface (API);
accessing, by calling the accessing module via a first API, a plurality of data sources that store data to be utilized for generating a single consolidated view data of resource information onto a display;
determining, by calling the determining module via a second API, based on accessing the plurality of data sources, whether data discrepancies exist in terms of data quality and consistency across the plurality of data sources;
automatically reconciling and normalizing the data to remove the discrepancies to enable standardized and accurate resource reporting onto the display, by calling the reconciling module via a third API;
transmitting, by calling the transmitting module via a fourth API, the reconciled and normalized data to a processor for performing in-memory processing of the reconciled and normalized data;
benchmarking, by calling the benchmarking module via a fifth API, the reconciled and normalized data against organizational goals and objective to generate benchmarked data;
generating, by calling the generating module via a sixth API, the single consolidated view data of resource information onto the display based on the benchmarked data;
uncovering meaningful and actionable insights;
providing optimized, actionable recommendations based on specific goals and priorities;
generating data models based on the in-memory processing of the reconciled and normalized data in real time;
implementing, by calling the implementing module via a seventh API, built-in controls to provide privileged access and to safeguard sensitive data elements;
utilizing encryption and the in-memory processing to enhance security and increase speed;
implementing, by calling the implementing module, various levels of abstraction so that users can view generic and specific data as needed;
generating the data models and workflows in a manner such that the generated data models and workflows are hierarchical, scalable and reliable;
managing pooled data accessed from the plurality of the data sources and supplementary data fields that are not accounted for or erroneously accounted for in any of the plurality of data sources based on the generated data models and workflows;
enforcing standardization and identifying any imbalances or gaps or deviations in supply data and demand data and the overall workforce strategy data based on the generated data models and workflows;
implementing, by calling the implementing module, a dedicated web interface and corresponding application programming interface (API) for data visualization and analysis; and
encrypting the data at rest and in transition by implementing security measures such that data returned to an adversary is anonymized and random to an extent that the adversary cannot use the data maliciously.

2. The method according to claim 1, further comprising:
capturing supplementary data fields that are not accounted for or erroneously accounted for in any of the plurality of data sources.

3. The method according to claim 1, further comprising:
implementing a forecasting engine;
transmitting all available data including the benchmarked data to the forecasting engine,
wherein the forecasting engine is configured to ingest all available data including the benchmarked data to generate an informed prediction data using predictive analytics techniques.

4. The method according to claim 3, further comprising:
implementing a recommendation engine that is powered by optimization algorithms; and
applying the optimization algorithms to the informed prediction data to generate the best path forward data while taking into account any constraints data identified by an organization.

5. The method according to claim 1, wherein the single consolidated view data of resource information includes detailed sub-pages to track granular data thereby allowing a user to engage in strategic, informed decision-making.

6. A system for intelligent tracking of data, the system comprising:
a plurality of data sources that store data to be utilized for generating a single consolidated view data of resource information onto a display; and
a processor operatively coupled to the plurality of data sources via a communication network, wherein the processor is configured to:
implement an intelligent data tracking module (IDTM) that provides a consolidated and comprehensive view of data from various perspectives at all levels of granularity, the IDTM including an accessing module, a determining module, a reconciling module, a transmitting module, a benchmarking module, a generating module, and an implementing module, wherein each module being called via a corresponding application programming interface (API);
access, by calling the accessing module via a first API, a plurality of data sources that store data to be utilized for generating a single consolidated view data of resource information onto a display;
determine, by calling the determining module via a second API, based on accessing the plurality of data sources, whether data discrepancies exist in terms of data quality and consistency across the plurality of data sources;
automatically reconcile and normalize the data to remove the discrepancies to enable standardized and accurate resource reporting onto the display, by calling the reconciling module via a third API;
transmit, by calling the transmitting module via a fourth API, the reconciled and normalized data to a processor for performing in-memory processing of the reconciled and normalized data;
benchmark, by calling the benchmarking module via a fifth API, the reconciled and normalized data against organizational goals and objective to generate benchmarked data;

generate, by calling the generating module via a sixth API, the single consolidated view data of resource information onto the display based on the benchmarked data;

uncover meaningful and actionable insights;

provide optimized, actionable recommendations based on specific goals and priorities;

generate data models based on the in-memory processing of the reconciled and normalized data in real time;

implement, by calling the implementing module via a seventh API, built-in controls to provide privileged access and to safeguard sensitive data elements;

utilize encryption and the in-memory processing to enhance security and increase speed;

implement, by calling the implementing module, various levels of abstraction so that users can view generic and specific data as needed;

generate the data models and workflows in a manner such that the generated data models and workflows are hierarchical, scalable and reliable;

manage pooled data accessed from the plurality of the data sources and supplementary data fields that are not accounted for or erroneously accounted for in any of the plurality of data sources based on the generated data models and workflows;

enforce standardization and identifying any imbalances or gaps or deviations in supply data and demand data and the overall workforce strategy data based on the generated data models and workflows;

implement, by calling the implementing module, a dedicated web interface and corresponding application programming interface (API) for data visualization and analysis; and encrypt the data at rest and in transition by implementing security measures such that data returned to an adversary is anonymized and random to an extent that the adversary cannot use the data maliciously.

7. The system according to claim 6, wherein the processor is further configured to:

capture supplementary data fields that are not accounted for or erroneously accounted for in any of the plurality of data sources.

8. The system according to claim 6, wherein the processor is further configured to:

implement a forecasting engine;

transmit all available data including the benchmarked data to the forecasting engine, wherein the forecasting engine is configured to ingest all available data including the benchmarked data to generate an informed prediction data using predictive analytics techniques.

9. The system according to claim 8, wherein the processor is further configured to:

implement a recommendation engine that is powered by optimization algorithms; and apply the optimization algorithms to the informed prediction data to generate the best path forward data while taking into account any constraints data identified by an organization.

10. The system according to claim 6, wherein the single consolidated view data of resource information includes detailed sub-pages to track granular data thereby allowing a user to engage in strategic, informed decision-making.

11. A non-transitory computer readable medium configured to store instructions for intelligent tracking of data, wherein, when executed, the instructions cause a processor to perform the following:

implementing an intelligent data tracking module (IDTM) that provides a consolidated and comprehensive view of data from various perspectives at all levels of granularity, the IDTM including an accessing module, a determining module, a reconciling module, a transmitting module, a benchmarking module, a generating module, and an implementing module, wherein each module being called via a corresponding application programming interface (API);

accessing, by calling the accessing module via a first API, a plurality of data sources that store data to be utilized for generating a single consolidated view data of resource information onto a display;

determining, by calling the determining module via a second API, based on accessing the plurality of data sources, whether data discrepancies exist in terms of data quality and consistency across the plurality of data sources;

automatically reconciling and normalizing the data to remove the discrepancies to enable standardized and accurate resource reporting onto the display, by calling the reconciling module via a third API;

transmitting, by calling the transmitting module via a fourth API, the reconciled and normalized data to a processor for performing in-memory processing of the reconciled and normalized data;

benchmarking, by calling the benchmarking module via a fifth API, the reconciled and normalized data against organizational goals and objective to generate benchmarked data;

generating, by calling the generating module via a sixth API, the single consolidated view data of resource information onto the display based on the benchmarked data;

uncovering meaningful and actionable insights;

providing optimized, actionable recommendations based on specific goals and priorities;

generating data models based on the in-memory processing of the reconciled and normalized data in real time;

implementing, by calling the implementing module via a seventh API, built-in controls to provide privileged access and to safeguard sensitive data elements;

utilizing encryption and the in-memory processing to enhance security and increase speed;

implementing, by calling the implementing module, various levels of abstraction so that users can view generic and specific data as needed;

generating the data models and workflows in a manner such that the generated data models and workflows are hierarchical, scalable and reliable;

managing pooled data accessed from the plurality of the data sources and supplementary data fields that are not accounted for or erroneously accounted for in any of the plurality of data sources based on the generated data models and workflows;

enforcing standardization and identifying any imbalances or gaps or deviations in supply data and demand data and the overall workforce strategy data based on the generated data models and workflows;

implementing, by calling the implementing module, a dedicated web interface and corresponding application programming interface (API) for data visualization and analysis; and encrypting the data at rest and in transition by implementing security measures such that data returned to an adversary is anonymized and random to an extent that the adversary cannot use the data maliciously.

12. The non-transitory computer readable medium according to claim 11, wherein the instructions, when executed, cause the processor to further perform the following:

capturing supplementary data fields that are not accounted for or erroneously accounted for in any of the plurality of data sources.

13. The non-transitory computer readable medium according to claim 11, wherein the instructions, when executed, cause the processor to further perform the following:

implementing a forecasting engine;

transmitting all available data including the benchmarked data to the forecasting engine, wherein the forecasting engine is configured to ingest all available data including the benchmarked data to generate an informed prediction data using predictive analytics techniques.

14. The non-transitory computer readable medium according to claim 13, wherein the instructions, when executed, cause the processor to further perform the following:

implementing a recommendation engine that is powered by optimization algorithms; and applying the optimization algorithms to the informed prediction data to generate the best path forward data while taking into account any constraints data identified by an organization.

15. The non-transitory computer readable medium according to claim 11, wherein the single consolidated view data of resource information includes detailed sub-pages to track granular data thereby allowing a user to engage in strategic, informed decision-making.

* * * * *